(12) United States Patent
McCann et al.

(10) Patent No.: US 6,296,413 B1
(45) Date of Patent: Oct. 2, 2001

(54) MOUNTING CLIP ELEMENTS

(75) Inventors: Marc A. McCann, Levittown, PA (US); John Jurechko, Burlington, NJ (US)

(73) Assignee: Central Safety Equipment Company, Burlington, NJ (US)

( * ) Notice: Subject to any disclaimer, the term of this patent is extended or adjusted under 35 U.S.C. 154(b) by 0 days.

(21) Appl. No.: 09/410,318

(22) Filed: Oct. 1, 1999

(51) Int. Cl.⁷ .............................. F16B 2/24; F16C 33/72
(52) U.S. Cl. ................. 403/51; 403/329; 384/15
(58) Field of Search ................... 403/326, 329, 403/50, 51, 335, 336; 248/300, 205.1; 384/15, 45

(56) References Cited

U.S. PATENT DOCUMENTS

| | | | |
|---|---|---|---|
| 1,883,627 | * 10/1932 | Draper | 248/300 |
| 3,788,377 | 1/1974 | Knowles | 160/84 R |
| 4,886,375 | 12/1989 | Tsukada | 384/15 |
| 4,986,508 | 1/1991 | Osawa et al. | 248/300 |
| 5,080,498 | * 1/1992 | Tsukada | 384/15 |
| 5,169,223 | 12/1992 | Suzuki et al. | 312/330.1 |
| 5,275,492 | * 1/1994 | Shirai | 384/15 |
| 5,451,023 | * 9/1995 | Johnston | 248/300 X |
| 5,531,521 | 7/1996 | Ochiai et al. | 384/15 |
| 5,775,813 | * 7/1998 | Saitoh | 384/15 |
| 5,871,283 | * 2/1999 | Isobe et al. | 384/15 |

OTHER PUBLICATIONS

Centryco Accuglide 55 Bearing Clip, Drawing #A02367C1 dated Jul. 30, 1998; Rail End Clip, Drawing #A02365A1 dated Mar. 26, 1996; Accuglide 55 Bearing Clip, Drawing #A01589C1 dated Jul. 23, 1998; and Rail End Clip, Drawing #A01590A1 dated Mar. 26, 1996.

\* cited by examiner

Primary Examiner—Harry C. Kim
(74) Attorney, Agent, or Firm—Synnestvedt & Lechner LLP

(57) ABSTRACT

A clip element for removably attaching a protective cover to a linear bearing is disclosed. The clip element can be mounted on either the fixed support or the movable carriage of the linear bearing and comprises a resilient arm extending in spaced relationship to the component. The spacing is sized to receive an end of the cover inserted beneath the arm. The arm is resiliently attached to a mounting plate which facilitates mounting of the arm onto the bearing. The arm is resiliently biased toward the plate to removably retain the cover when it is inserted beneath the arm. Clip elements for use on the carriage are joined by elongated connecting members which extend between the mounting plates and position the clip elements at each end of the carriage. Clip elements are attached to the linear bearing by means of fasteners or double sided adhesive tape. Apertures or slots sized to accept the fasteners are positioned in the mounting plate to overlie preexisting holes in the bearing or are match drilled upon installation. A method is also disclosed which uses the clip elements to effect the rapid replacement of worn covers, the method comprising the steps of removing the ends of the old cover from beneath the resilient arms of the clip elements and inserting the ends of the new cover beneath the arms.

19 Claims, 7 Drawing Sheets

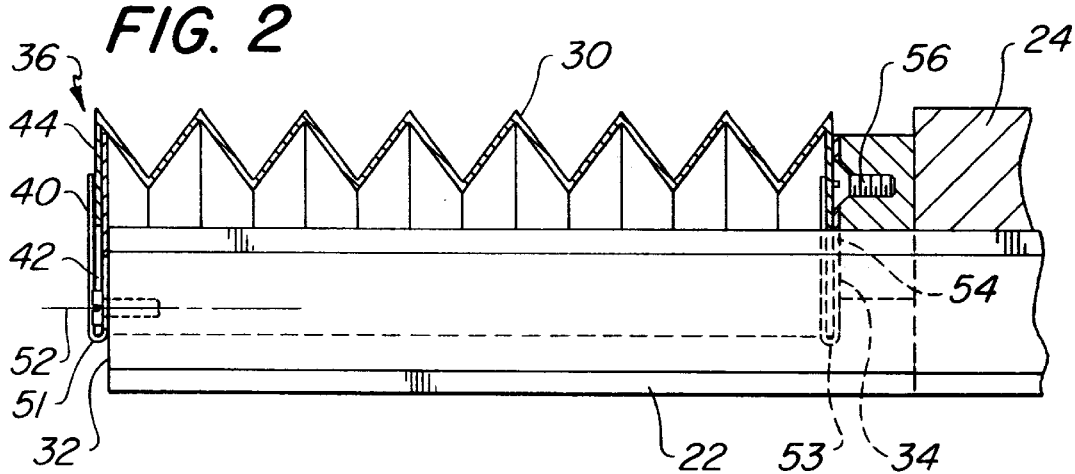
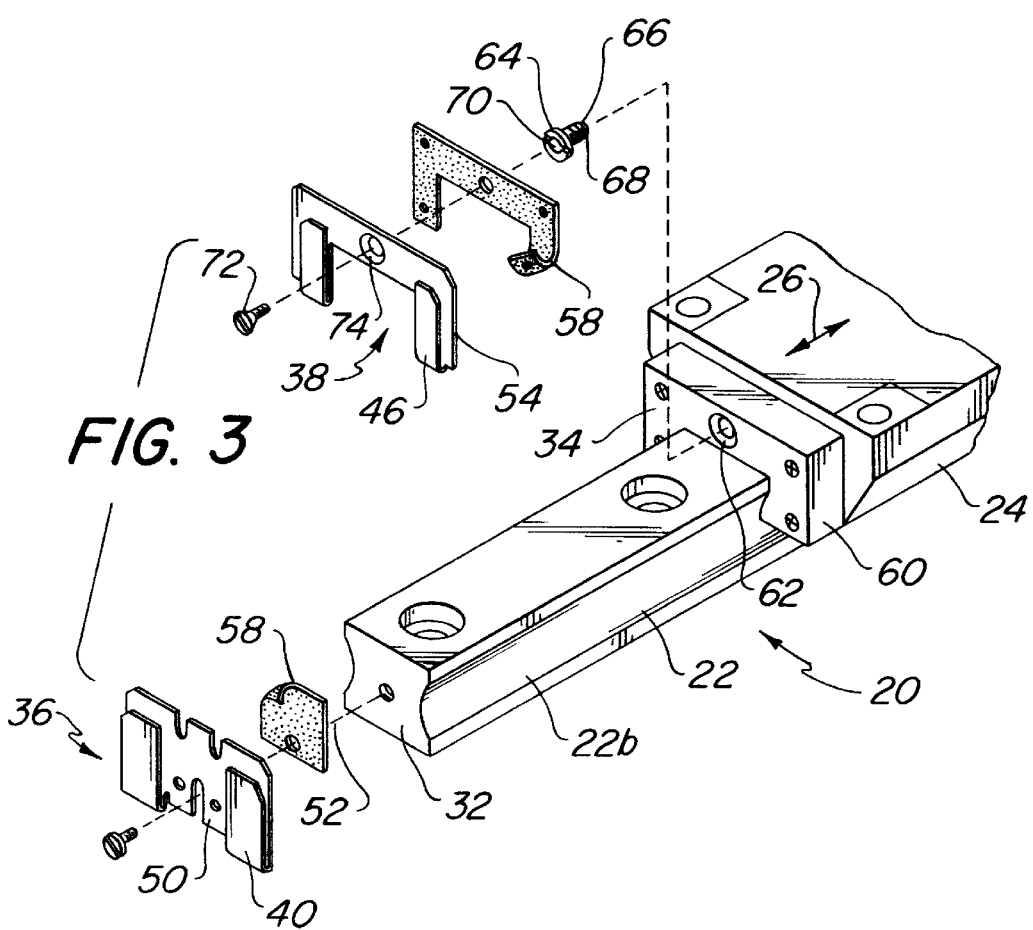

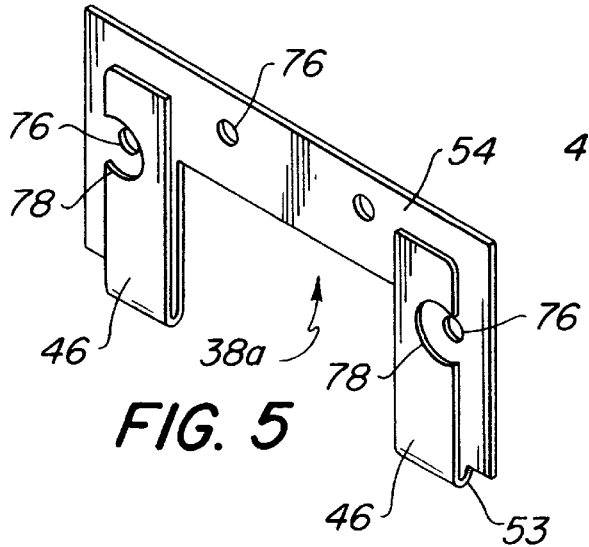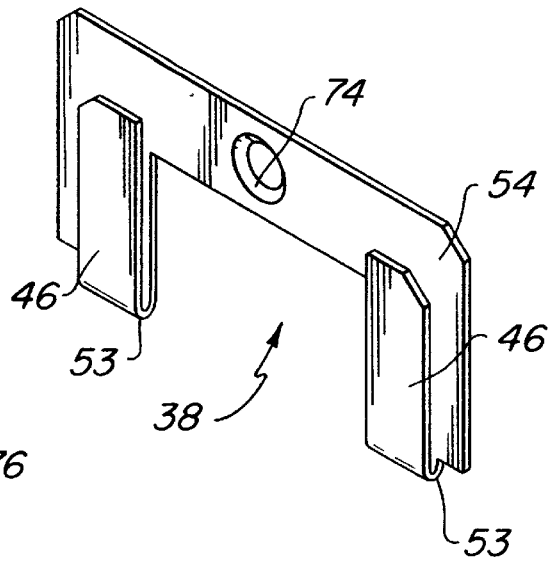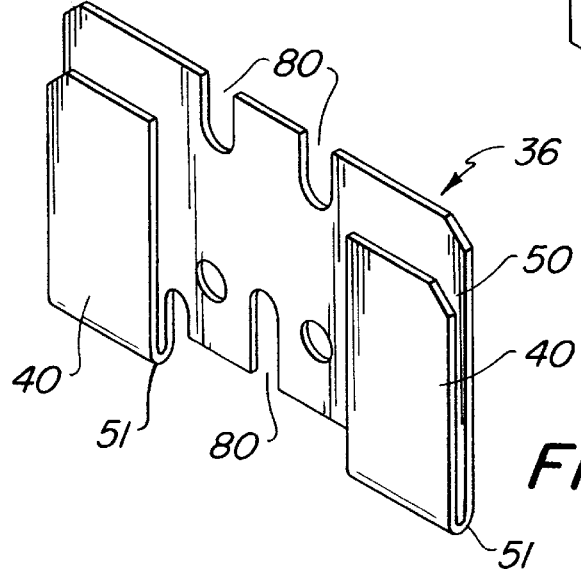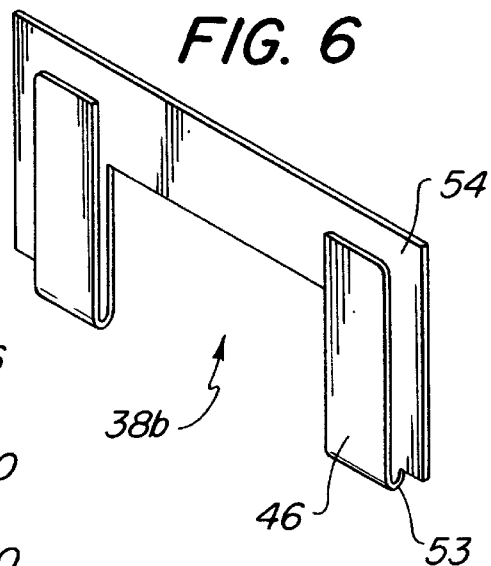

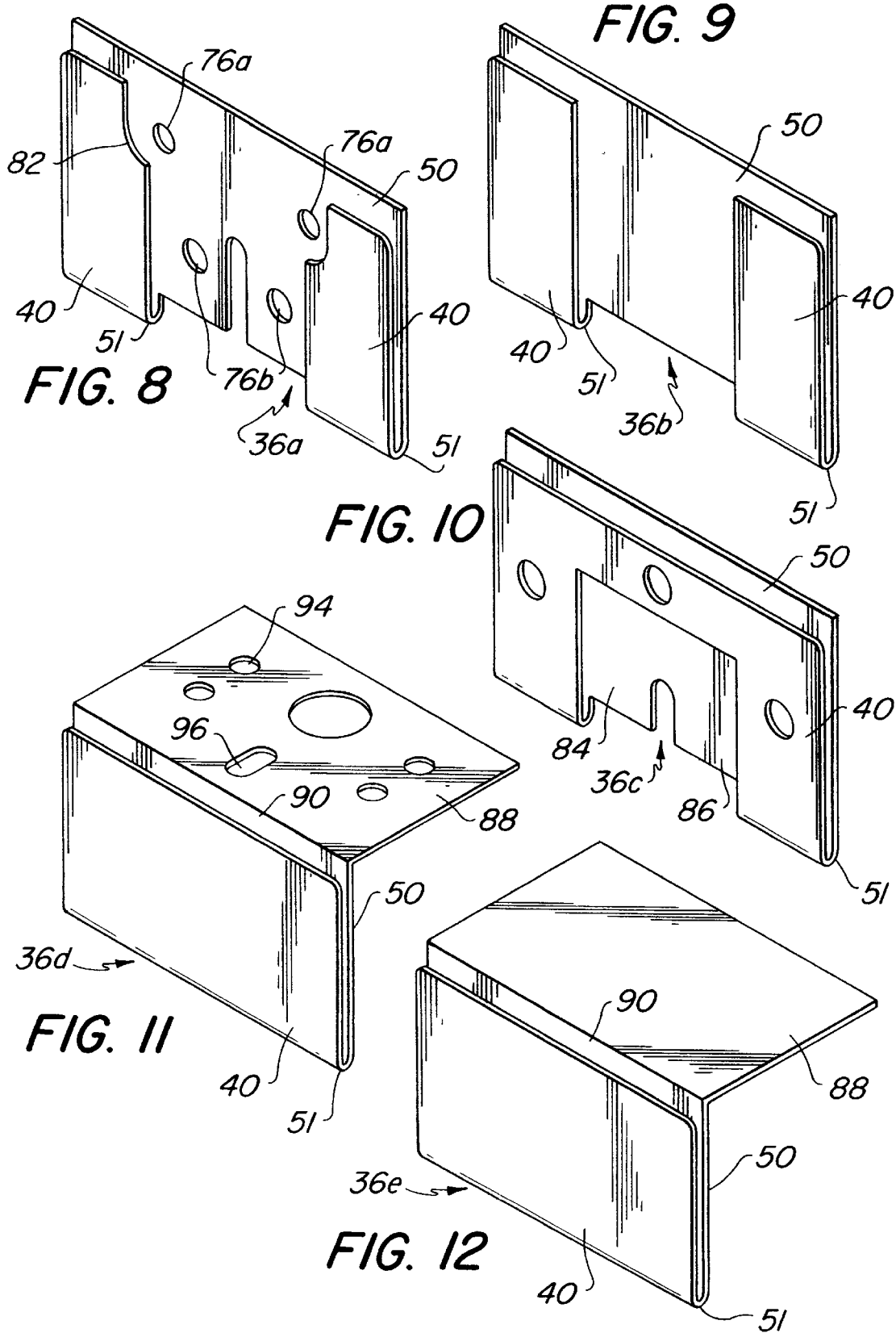

MOUNTING CLIP ELEMENTS

FIELD OF INVENTION

This invention relates to clip elements for removably mounting protective covers on machine components, especially linear bearings.

BACKGROUND OF INVENTION

Linear bearings find widespread use throughout industry and are vital components in every machine which requires that one part move relatively to another part smoothly, precisely and accurately along a linear track. Linear bearings are found in machine tools such as milling machines, in processing equipment, optical devices and agricultural equipment, to name only a few examples.

Linear bearings have an elongated support, such as a rail on which a carriage is mounted for lengthwise sliding movement. The support serves as a guide way for precisely and accurately positioning the carriage at a desired location or moving the carriage over a precise path at a predetermined speed. The carriage carries a component, such as a milling head with a cutting tool, and the use of the linear bearing allows the cutting tool to be brought to bear on a workpiece for the precise and accurate machining of a metal part. Ball or roller bearings may be used between the support and the carriage to facilitate the sliding motion of the carriage along the support. The interface between the carriage and the support may be lubricated to eliminate friction and ensure smooth sliding motion of the relatively moving parts. Dimensional tolerances required between the support and carriage will vary depending upon the application. For example, linear bearings used in machine tools or as optical benches will require very close tolerances allowing for precise control of motion and positioning of the carriage, whereas greater dimensional variations may be acceptable for processing or agricultural equipment. The size of the linear bearing will vary with the application as well, from heavy, robust bearings used in machine tools to lightweight bearings for use in a laboratory.

It is often necessary to protect linear bearings from their immediate environment to ensure their continued smooth, precise and accurate operation. This is especially critical for linear bearings used in machine tools which are constantly subjected to foreign particles such as dirt, dust, metal filings and chips or other debris typically present in a machine shop. The lubricant on the support causes the foreign particles to adhere to its surface and even the smaller foreign particles can adversely affect the bearing's operation due to the close tolerances between the support and the carriage. Particles which accumulate on the support hinder the smooth motion of the carriage, causing it to jam or stick, to move erratically, to lose positioning accuracy and increase the wear between the relatively moving parts, thus, reducing the life of the bearing.

It is known to sheath the support with a flexible protective cover, in the form of a bellows, to prevent foreign particles from accumulating on it. One end of the bellows is attached to an end of the support, and the other end of the bellows is attached to an end of the carriage proximal to the support end. The folds of the bellows are oriented perpendicularly to the long axis of the support and thus allow the bellows to expand or compress as needed along the length of the support to compensate for the motion of the carriage relative to the support end and keep the support covered. There is usually a separate bellows on each side of the carriage ensuring coverage of the entire support.

Bellows are subject to constant flexing as the carriage moves along the support and thus wear out over time. Replacement of the bellows is a time consuming process because the bellows are typically fastened to the support end and carriage end with bolts which must first be removed (using tools such as a wrench or nut driver) to free the bellows, and then the new bellows must be positioned over the support and bolted in place (again using tools). While it is a simple procedure, it takes time to effect the changeover and the machine tool or other apparatus is idle during this servicing.

Machine downtime adversely affects production efficiency and consequently profits, and it is desirable that downtime be minimized whenever possible. This is especially true when one considers the cumulative effect on production efficiency when the downtime is summed over many machines. There is a clear need for an apparatus and a method which will allow the bellows on linear bearings to be changed simply and rapidly, without the need for tools, thus, minimizing machine downtime and increasing production efficiency.

SUMMARY AND OBJECTS OF INVENTION

The invention comprises a clip element for removably attaching a flexible protective cover, such as a bellows, over an elongated support, such as a rail providing a guide way for a linear bearing. The support has a carriage movably mounted for motion along its length, the carriage providing a convenient mounting platform for a machine tool such as a milling head, for example.

The clip element comprises a resilient arm mountable on an end of either the support or the carriage component. The arm extends in spaced relationship to the component end on which it is mounted and has a predetermined spacing sized to receive one end of the cover inserted beneath the arm. The arm is resiliently biased toward the component end and removably retains the cover to it.

Preferably, the clip element includes a mounting plate mounting the arm on the component end. The arm is resiliently attached to the mounting plate to provide the resilient biasing mentioned above. The mounting plate is attachable to the component end and is oriented perpendicularly to the long axis of the support.

In a preferred embodiment of the invention suitable for linear bearings used in machine tools, the mounting plate has a plurality of apertures, each aperture being sized to accept a respective fastener for attaching the clip element to the component end. Fasteners such as bolts are preferred in applications requiring greater strength and robustness, as required by the heavy use associated with machine tools. Often the apertures through the mounting plate are arranged to overlie preexisting holes in the component end thereby allowing the fasteners to engage the preexisting holes and attach the mounting plate to the end. This saves time and effort as special holes do not need to be drilled and tapped in the machine component.

A plurality of elongated slots through the mounting plate is also useful, each of the slots being sized to accommodate a respective fastener attaching the mounting plate to the component end. Slots increase the versatility of the mounting plate, allowing it to be used with a larger variety of different component ends which may have preexisting holes in different locations. A slotted mounting plate will be able to accommodate the positional variations of the preexisting holes and still allow the clip element to be effectively positioned as necessary relatively to the component end.

For lighter duty applications, it is preferred to bond the mounting plate to the component end using a piece of double sided adhesive tape. The tape is interposed between the mounting plate and the component end, adheres to both items thereby attaching them together. Tape having a thick foam center is particularly favored because it accommodates itself to irregularities in the component end such as bolt heads, detents, contours and dimples while providing a flat, smooth opposite surface interfacing with the mounting plate to provide a good adhesive bond.

When needed, another resilient arm is mounted on the component end. Like the first arm, the other arm also extends in spaced relationship to the component end and has a predetermined spacing sized to receive the end of the cover inserted beneath it. The other arm is also resiliently biased toward the component end and helps to removably retain the cover by distributing the forces over a larger area of the cover, thereby reducing the stress on the cover and its propensity to tear. The arms are preferably arranged side-by-side in spaced relation from one another.

To increase the area of contact between the clip element and the component end, a flange is added to the mounting plate. The flange extends substantially perpendicularly from the mounting plate and is engageable with a surface of the support or the carriage which is perpendicular to the end on which the clip is mounted. The flange helps support and attach the clip element and can have a plurality of apertures or slots sized to accept respective fasteners or can be used with the double sided adhesive tape mentioned above to affix the clip element to the component end.

While the single clip elements work equally well on either the support or the carriage, it is sometimes preferable to join two clip elements together when fitting them onto the carriage. This configuration includes first and second mounting plates mountable on opposite ends of the carriage in a parallel, spaced-apart relationship. The two mounting plates are joined by first and second elongated connecting members extending between and attached to the mounting plates. The connecting members have a length sized to position the mounting plates at opposite ends of the carriage. Preferably, the connecting members are arranged along opposite sides of the carriage and are removably or integrally attached to the mounting plates.

Preferably, the connecting members are removably attached to the mounting plates using first and second ears arranged respectively on first and second edges of the first mounting plate. The ears extend substantially perpendicularly to the long axis of the support outwardly of the carriage. Third and fourth ears are also arranged respectively on first and second edges of the second mounting plate and also extend substantially perpendicularly to the long axis of the support outwardly of the carriage. The first elongated connecting member extends between the first and third ears, and the second elongated connecting member extends between the second and fourth ears. The connecting members are respectively attached to the ears and thereby joining the mounting plates together.

A single connecting member is also used to join two mounting plates together for mounting on the carriage. In this configuration, a second mounting plate is again mountable on an opposite end of the carriage in a parallel, spaced-apart relation to the first mounting plate. The mounting plates each have respective top edges positionable above the top surface of the carriage. A connecting element extends between the top edges and is positionable in overlying relationship with the top surface of the carriage. The connecting element is attached to the mounting plates and has a predetermined length positioning the mounting plates at opposite ends of the carriage when it is in overlying relationship with the carriage top surface.

Preferably, the connecting element comprises a connecting plate disposed perpendicularly to the mounting plates and adapted to fit in overlying relation with the carriage. The connecting plate has a plurality of holes sized to accept fasteners if it is desired to attach the mounting plates to the carriage by this means. Adhesive tape between the connecting plate and the carriage is also an effective attachment means.

For positioning the clip element on the carriage or on the support, a plurality of tabs is provided. The tabs extend perpendicularly from the mounting plate parallel to the long axis of the support. At least one of the tabs is positioned to engage a first surface of the support or the carriage, another of the tabs is positioned to engage a second surface of the support or the carriage arranged at an angle to the first surface. When the tabs engage the surfaces, they support and position the mounting plate at a predetermined position at the component end.

The invention also includes a method of removably attaching a flexible protective cover over a portion of an elongated support having a carriage movably mounted thereon. The method comprises the steps of (1) mounting a first resilient arm, described above, on an end of the support; (2) mounting a second resilient arm, also as described above, on an end of the carriage proximal to the support end; (3) inserting one end of the cover beneath the first arm; and (4) inserting an opposite end of the cover beneath the second arm.

When so positioned, the cover will overlie a portion of the support located between the proximal carriage end and the support end.

The method applies when the cover is being replaced as well. This occurs when the clip elements are already installed on the component ends. The steps of the method include (1) removing one end of the old cover from beneath the first arm; (2) removing an opposite end of the old cover from beneath the second arm; (3) removing the old cover from overlying relationship with the portion of the support; (4) inserting one end of the new cover beneath the first arm; and (5) inserting an opposite end of the new cover beneath the second arm.

The new cover is positioned in overlying relationship with the portion of the support located between the proximal carriage end and the support end.

It is an object of the invention to provide a clip element for removably attaching a protective cover over an elongated support, such as found on linear bearings.

It is another object of the invention to provide a clip element allowing the rapid removal and replacement of the protective cover without the need for tools.

It is yet another object of the invention to provide a clip element which can be used on a wide variety of linear bearings without extensive modification to the clip element.

It is still another object of the invention to provide a clip element which permits the rapid replacement of protective covers to minimize machine downtime.

It is also another object of the invention to provide a clip element which can be used with equal facility on either the support or the carriage of a linear bearing.

It is again another object of the invention to provide a clip element which can be used for both heavy and light duty.

It is a further object of the invention to provide a method whereby a protective cover for a linear bearing can be easily and rapidly replaced without the need for tools.

These and other objects will become apparent from a consideration of the following drawings and detailed description.

BRIEF DESCRIPTION OF DRAWINGS

FIG. 2 is a cross-sectional view taken along lines 2—2 of FIG. 1;

FIG. 3 is a partially exploded perspective view of the linear bearing shown in FIG. 1 illustrating an alternate means for attaching the clip elements to the bearing components;

FIGS. 4–6 show various embodiments of clip elements for use on a carriage or a support of a linear bearing;

FIGS. 7–12 show various embodiments of clip elements for use on a support of a linear bearing;

DETAILED DESCRIPTION OF PREFERRED EMBODIMENTS

Figure 1:
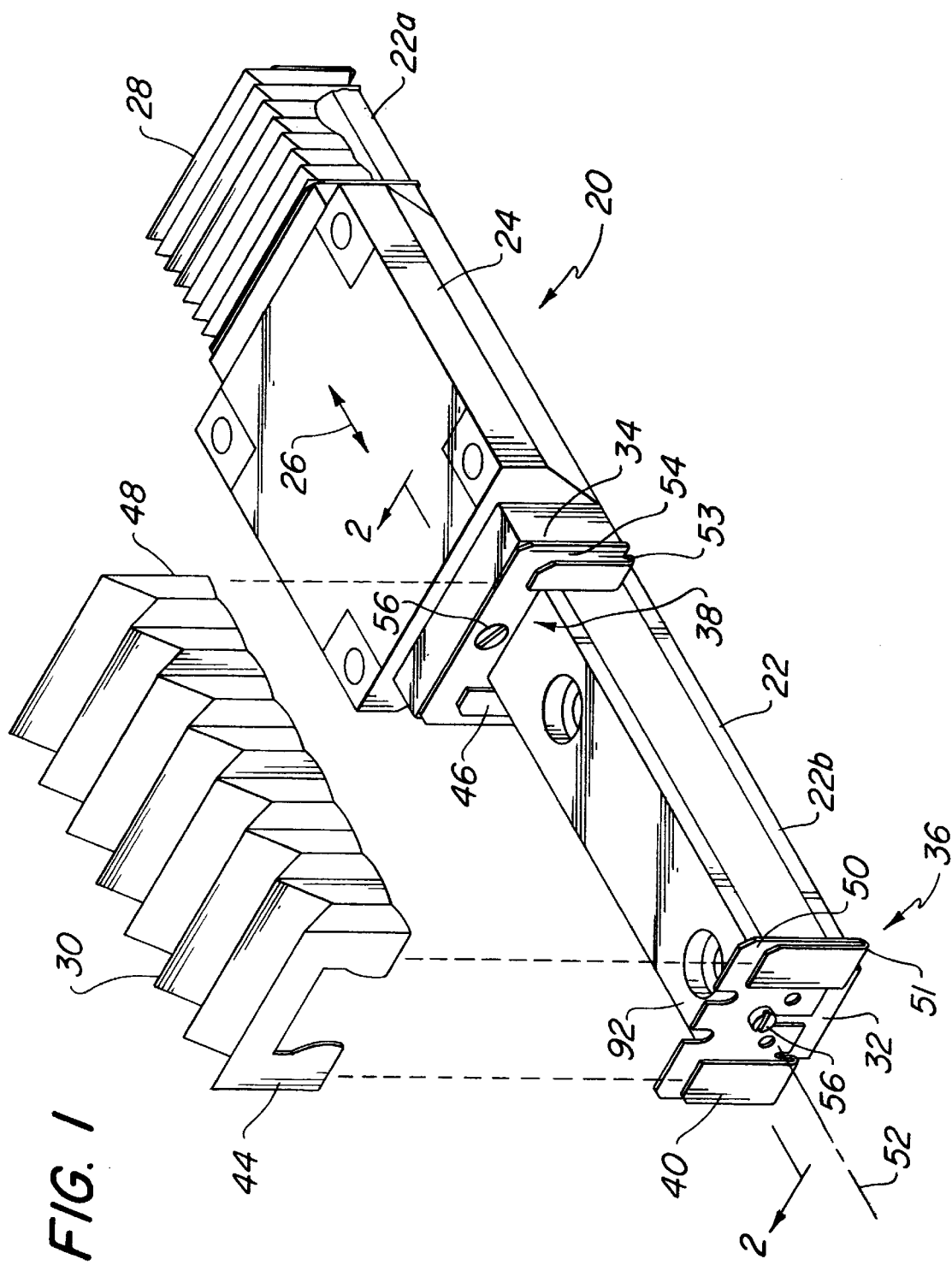
FIG. 1 shows a partially exploded isometric view of a linear bearing having protective covers attached by clip elements according to the invention.

FIG. 1 shows a linear bearing 20 having an elongated support 22 forming a guide way. A carriage 24 is mounted on the support 22 for linear motion lengthwise along the support, as indicated by the arrow 26. Linear bearing 20 has many uses in industry as described above and could, for example, be mounted in a machine tool, and a milling head could be mounted on carriage 24 for linear motion in machining metal components.

A protective cover 28, in the form of a bellows, is shown installed in overlying relation with a portion 22a of support 22 to the right of carriage 24. A similar cover 30 is shown in the exploded portion of the view to the left of the carriage. When installed, cover 30 protects a support portion 22b located between the end 32 of support 22 and the proximal end 34 of carriage 24. The bellows form is advantageous because it allows the cover to expand and contract as necessary to compensate for the motion of carriage 24 along support 22 defined by arrow 26. Thus, the support is always protected from foreign matter which might otherwise accumulate on it and hinder the operation of the linear bearing.

Clip elements 36 and 38 are also illustrated in FIG. 1. Clip element 36 removably attaches cover 30 to the end 32 of support 22 and comprises a resilient arm 40. When clip element 36 is mounted on the end of the support, arm 40 extends in spaced relationship to end 32 with a predetermined spacing 42 (best seen in the cross-sectional view of FIG. 2) sized to receive an end 44 of cover 30 inserted beneath the arm, as shown in detail in FIG. 2. Arm 40 is resiliently biased toward support end 32 and removably retains the cover to the support end. A similar clip element 38 also having a resilient arm 46 is mounted on the proximal end 34 of carriage 24 and removably retains the opposite end 48 of cover 30 to the carriage in a similar fashion.

To facilitate mounting of arm 40 to the end 32 of support 22 the arm is resiliently attached to a mounting plate 50 which is oriented perpendicularly to the long axis 52 of support 22. The resilient attachment of arm 40 to mounting plate 50 is preferably effected by integrally forming the arm with the mounting plate and forming a reverse bend 51 where the arm joins the plate. Similarly, arm 46 is resiliently attached by means of a reverse bend 53 to a mounting plate 54 for attaching that arm to end 34 of carriage 24.

There are various means for effecting the attachment of the mounting plates to their respective component ends. FIG. 1 shows threaded fasteners 56 being used to secure mounting plates 50 and 54 to the support 22 and carriage 24 respectively. Fasteners are preferred when the linear bearing is designed to be robust and survive heavy duty, as in the machine tool application provided above, as an example. FIG. 3 shows an alternate attachment means using double sided adhesive tape 58, ideal for lighter duty applications such as an optical bench in a laboratory. Tape 58 is interposed between the mounting plate and the end of the component to which it is to be attached, adhering both the mounting plate and the end and attaching the two items together.

Preferably, the clip elements are made from durable materials such as stainless steels or spring steels which are resilient and tough. If less expensive or lighter weight clip elements are desired, they can also be formed from plastic material, such as polystyrene, which will have sufficient resilience and toughness for certain applications.

From FIGS. 1 and 2, one can immediately see the advantage afforded by the invention as the cover 30 can be readily and rapidly replaced by simply removing ends 44 and 48 from engagement with arms 40 and 46, respectively, removing the cover from overlying relationship with support portion 22b and placing a new cover over the support portion and engaging its ends with arms 40 and 46. No tools are required, and machine downtime and labor costs for replacing the covers are minimal.

FIG. 3 illustrates a particular means for mounting clip element 38 onto carriage 24 using structure specific to the carriage. Lubricant in the form of grease is often contained in a grease reservoir 60 forming the end 34 of the carriage. A grease port 62 is provided in the reservoir for refilling the grease as it is consumed. Usually commonly available threaded fasteners will not properly engage the threads of the grease port, so a customized fastener 64 is used as an adapter. Fastener 64 has threads 66 cut in the shaft 68 which are specifically engageable with the threads of the grease port 62. Shaft 68 has an internal bore 70 having internal threads matched to the external threads of a commonly available bolt 72. Thus, to effect attachment of mounting plate 54 to carriage 24 using the grease port 62 the fastener 64 is threaded into grease port 62, the mounting plate 54 is positioned with an aperture 74 aligned with the fastener bore 70, and the common bolt 72 is then threaded into the bore, capturing mounting plate 54.

Clip elements according to the invention have various configurations depending upon the specific application for which they are designed. FIGS. 4–12 show some examples of the variations which are encompassed by the invention.

FIG. 4 shows the clip element 38 in detail. Clip element 38 features two resilient arms 46 attached to the mounting plate 54, the arms 46 being arranged side-by-side in spaced relation from one another. Two spaced arms are able to straddle the support 22 and will not interfere with the motion of carriage 24. Two resilient arms will also distribute the forces expanding and compressing the cover 30 over a greater area, thereby lowering the stresses on the cover and reducing any tendency which the cover might have to tear at or near the interface between the cover and the clip element.

FIG. 5 shows another clip element 38a for use on carriage 24 featuring a plurality of apertures 76. Each aperture 76 is sized to accept a respective fastener (not shown) for attaching the clip element to the carriage. If there are preexisting drilled and tapped holes in the end 34 of carriage 24, then apertures 76 are arranged to overlie the preexisting holes when mounting plate 54 is mounted onto the end 34. This allows the fasteners to engage the preexisting holes to attach the clip element to the end 34. The relatively large diameter holes 78 in arms 46 overlie certain of apertures 76 and provide access for tools, such as a screwdriver, for torquing the fasteners used to attach the clip element.

FIG. 6 illustrates another clip element 38b having no mounting holes. Such a clip element is meant for light duty and is attachable to the carriage via an adhesive, for example, the double-sided adhesive tape 58 seen in FIG. 3. Apertures could also be drilled through the clip element as required.

FIG. 7 shows clip element 36 in detail having two resilient arms 40 integrally formed with mounting plate 50 and biased by means of reverse bend 51. Clip element 36 features a plurality of slots 80 which are sized to accept fasteners for attaching the clip element to the end 32 of support. Slots 80 increase the versatility of the clip element by allowing the mounting plate to be located at various positions relatively to preexisting holes in the support end and yet still be retained by fasteners engaging a slot and a hole. Thus, the mounting plate 50 can easily adapt to multiple variations in hole position as long as a portion of the slot overlies a hole when the mounting plate is in the proper position on the support end.

FIG. 8 shows a clip element 36a similar to clip element 36 but having apertures 76a and 76b arranged to overlie preexisting apertures in a support end. A cut-away 82 is seen in arms 40, the cut-away allowing tool access for torquing fasteners engaging apertures 76a.

FIG. 9 illustrates a clip element 36b for mounting on an end of the support 22. This clip element has no holes and can be adhesively bonded to the support or apertures could be match-drilled with holes in the support end at the time of installation. Apertures could also be drilled which overlie preexisting holes in the support when the clip element is mounted on the support.

FIG. 10 shows a clip element 36c having a single resilient arm 40 with a cut-out 84. The cut-out exposes the surface 86 of mounting plate 50 underlying arm 40 and allows access to a greater portion of the mounting plate for drilling of apertures and torquing of fasteners.

FIGS. 11 and 12 illustrate clip elements 36d and 36e respectively, each of which has a flange 88 extending substantially perpendicularly from the mounting plate 50. Flange 88 extends from an upper edge 90 of the mounting plate and engages a surface of support 22 when the clip element 36d or 36e is mounted on the end 32. Flange 88 would engage the top surface 92 of support 22 seen in FIG. 1. As seen in FIG. 11, flange 88 can have apertures 94 or slots 96 sized to accept fasteners for attaching the clip element to the support.

Figure 13:
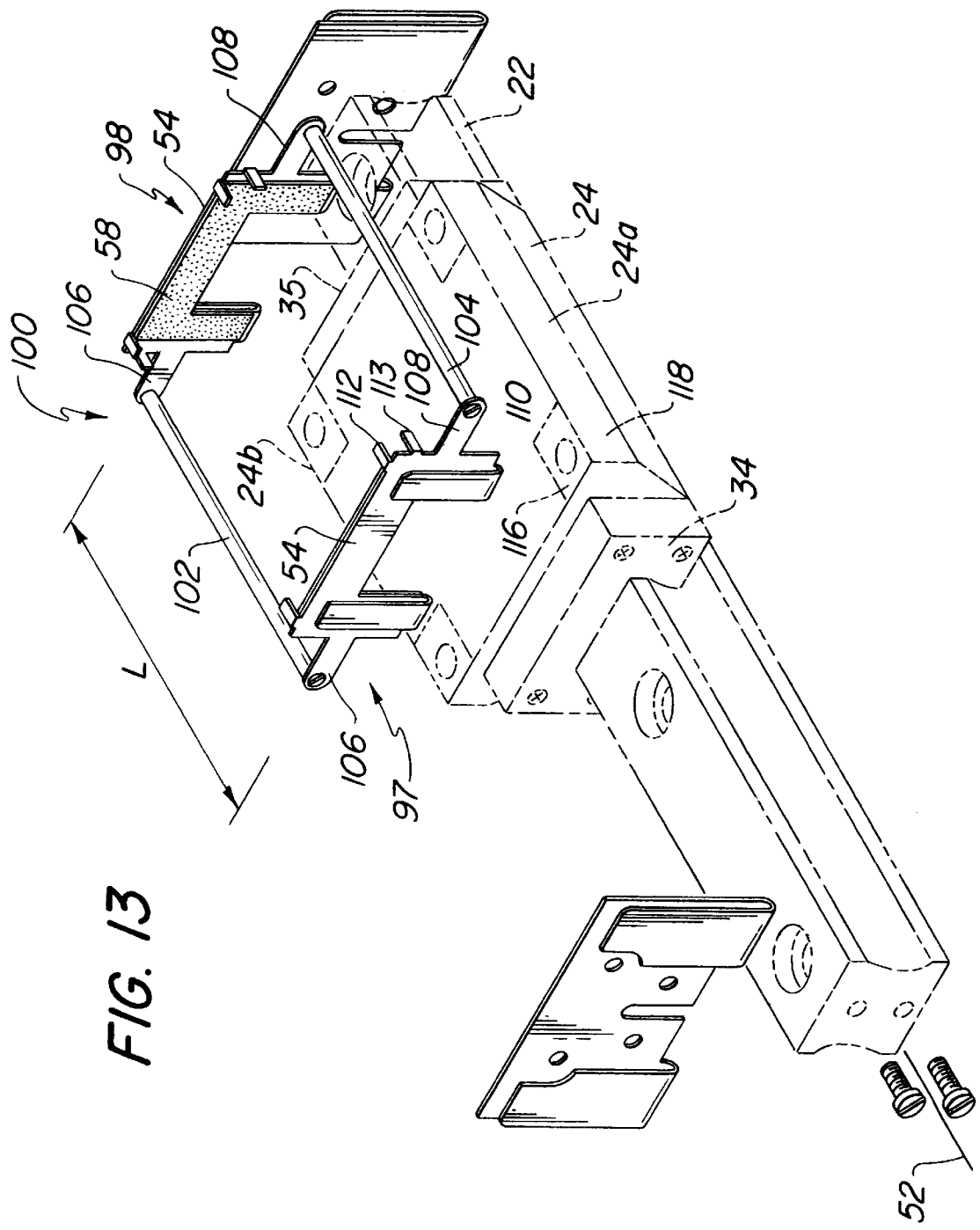
FIG. 13 shows a partially exploded isometric view of connected clip elements for use on a carriage of a linear bearing.

FIG. 13 illustrates clip elements 97 and 98 which are joined together as an assembly 100 which conveniently fits onto carriage 24. Clip elements 97 and 98 are joined by means of elongated connecting members 102, 104 which extend between and are attached to the mounting plates 54 of each clip element. Connecting members 102 and 104 have a length "L" sized to position the mounting plates 54 at opposite ends 34 and 35 of the carriage 24 when the assembly 100 is positioned on the carriage. Connecting members 102 and 104 will be sized differently depending upon the particular carriage onto which the clip elements 98 are to be mounted. Combining the clip elements on the carriage into an assembly simplifies the initial installation of the clip elements and allows them to be attached to the carriage by fewer fasteners since only one clip element need be fastened to the carriage.

Figure 14:
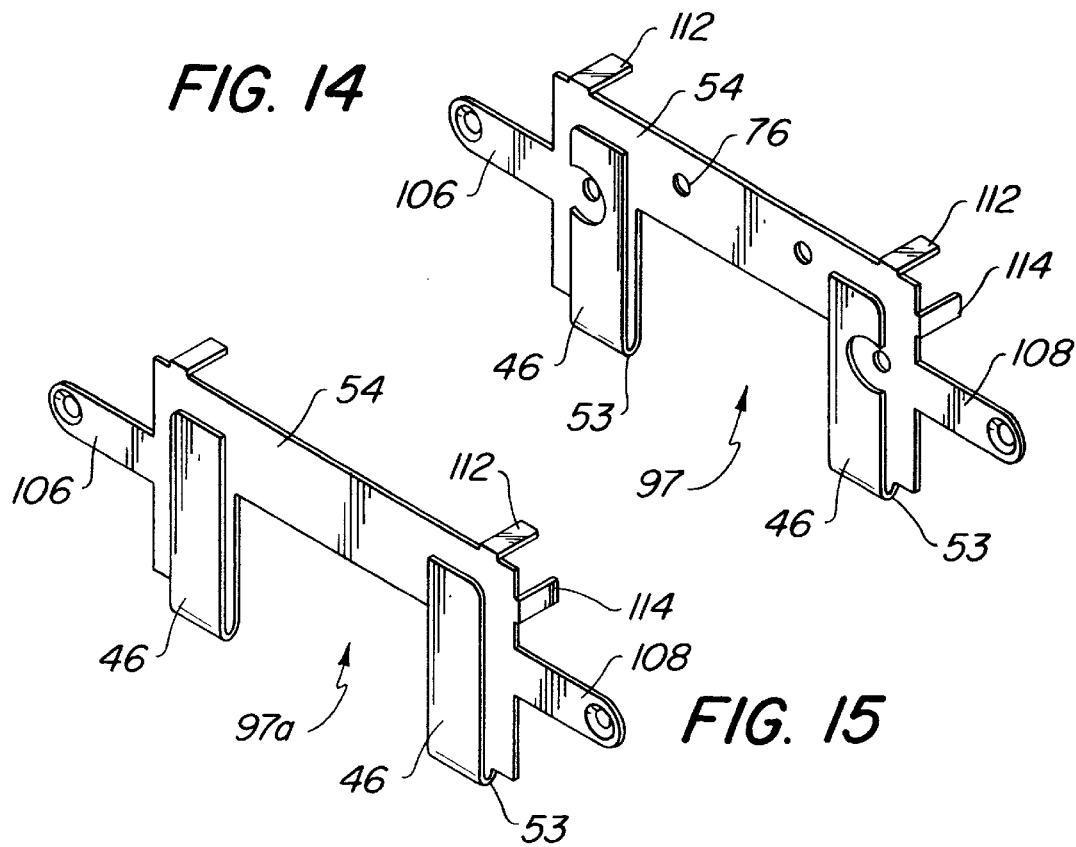
FIGS. 14–17 show various embodiments of connected clip elements for use on a carriage of a linear bearing.

FIG. 14 shows the clip element 97 in detail, the clip element having mounting plate 54 and resilient arms 46 similar to other clip elements previously described. Additionally, clip elements 97 and 98 have ears 106 and 108 which extend outwardly from the carriage 24, substantially perpendicularly to the long axis 52 of the support 22. Connecting elements 102 and 104 are attached to the ears on both clip elements, thereby joining them together. As seen in FIG. 13, it is preferred to locate the connecting members on opposite sides 24a and 24b of the carriage 24 as this configuration tends not to interfere with the operation of the bearing, the mounting of the bearing onto a machine or the mounting of devices to the carriage. Connecting elements 102 and 104 are preferably removably attached to the ears 106, 108, for example, by means of screws 110. This allows clip elements 97 and 98 to be used with many different length carriages, as all that is required is connecting elements of the proper length in order to complete an assembly.

Clip elements 97 and 98 also have tabs 112 and 114 which extend perpendicularly from mounting plates 54 parallel to the long axis 52 of support 22. The tabs serve to position the mounting plates at predetermined positions on the carriage 24 by engaging different surfaces of the carriage. As seen in FIG. 13, tabs 112 of either clip element will engage the upper surface 116 of carriage 24 preventing the assembly 100 from downward movement, while tabs 114 will engage the side surfaces 118 of the carriage preventing any lateral movement of the assembly 100. Note that these surfaces 116 and 118 are at an angle relative to one another, and this relationship allows the tabs to fix the position of the clip elements relatively to the carriage when the tabs 112 and 114 respectively engage the carriage top and side surfaces.

Figure 15:
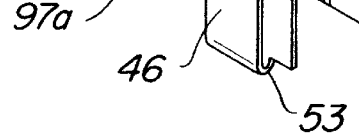

Whereas clip element 97 can be attached to carriage 22 by means of fasteners engaging existing apertures 76, FIG. 15 shows a similar clip element 97a without apertures 76. This clip is mountable via adhesive means such as the double-sided adhesive tape mentioned above, or apertures can be drilled in the mounting plate 54 as required.

Figure 16:
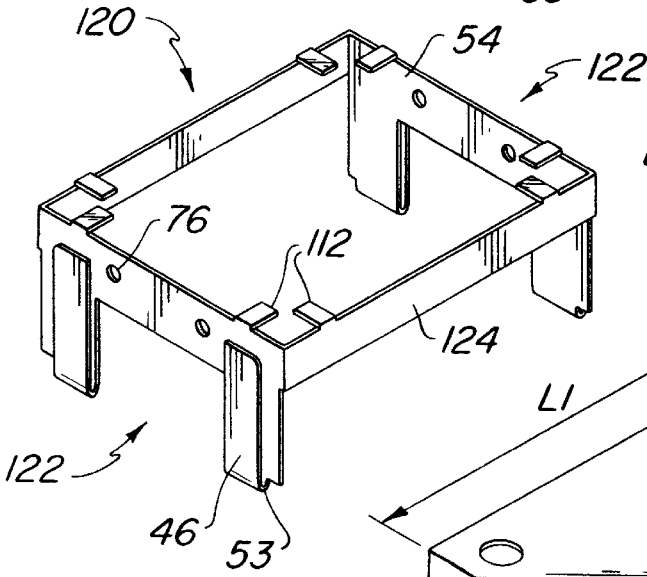

FIG. 16 shows an assembly 120 comprising clip elements 122 joined by elongated connecting members 124 and 126 which are integrally formed with the clip elements 122 to provide an integral attachment of the connecting members to the mounting plates 54. This configuration provides a simple, lightweight design which is easily mountable on a carriage. The assembly 120 can be attached to the carriage by any of the various means described above.

Figure 17:
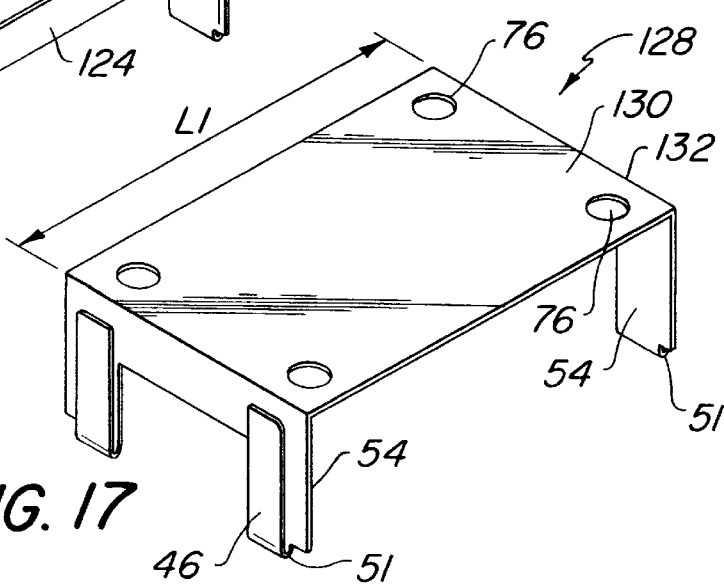

FIG. 17 illustrates an assembly 128 having a single connecting element in the form of a connecting plate 130 extending between the top edges 132 of mounting plates 54. Plate 130 is disposed perpendicularly to mounting plates 54 and is positionable in overlying relationship with the top surface 116 of carriage 24. The plate 130 has a predetermined length "L1" sized to position the mounting plates 54 at opposite ends 34 and 35 of carriage 24. Plate 130 is preferably attached to carriage by fasteners engaging apertures 76 or, alternately, by means of double-sided adhesive tape interposed between the plate and the surface 116 of the carriage.

Figure 18:
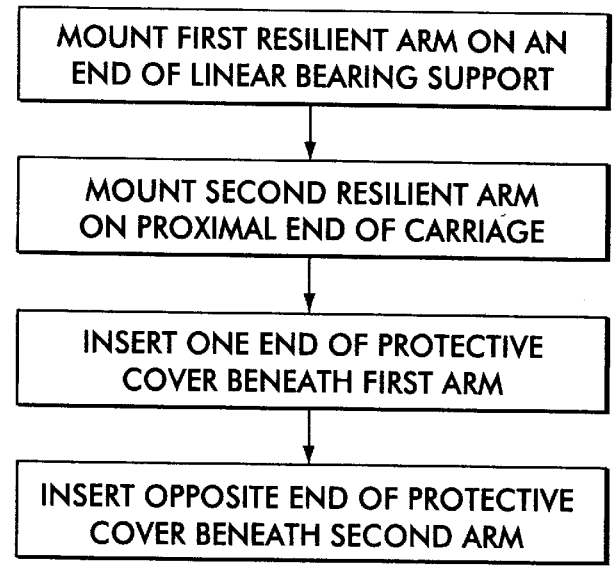
FIGS. 18 and 19 are flow charts depicting methods for replacing protective covers according to the invention.
Figure 19:
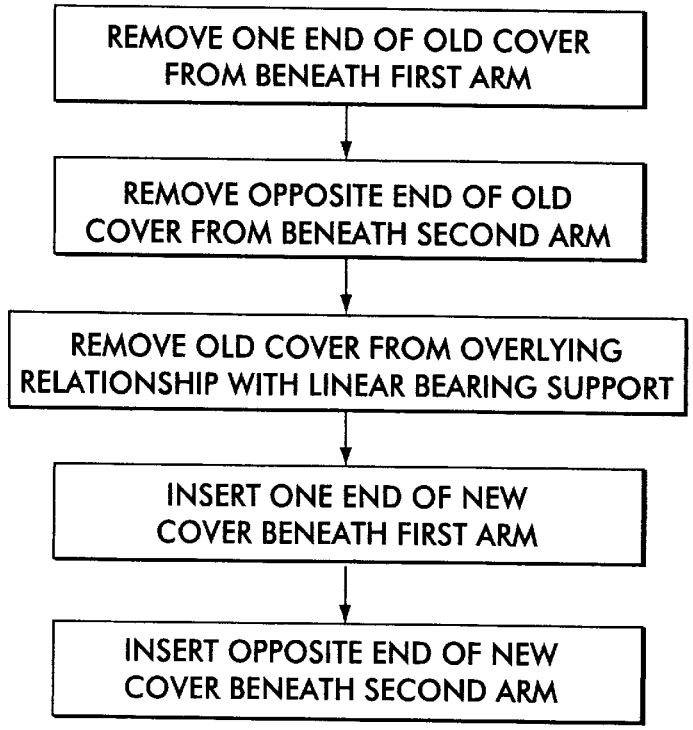

FIGS. 18 and 19 are flow charts describing a method for replacing protective covers on linear bearings. In FIG. 18, it is assumed that clip elements according to the invention have not been installed on the support or the carriage, and that there is no protective cover on the linear bearing. Thus, the first two steps involve mounting one clip element on an end of the support and another clip element on a proximal end of the carriage. These steps are graphically illustrated in the exploded views of FIGS. 1, 3 and 13.

The next steps of the method described in FIG. 18 involve inserting the ends of the cover beneath the resilient arms of the clip elements. FIG. 2 illustrates the completion of this step for the clip element on the end 34 of support 22. The method of FIG. 18 is used to convert a linear bearing over to use of the clip elements according to the invention from a prior art method of attaching and replacing the covers. The steps of this method need only be performed once for a particular bearing.

FIG. 19 describes the steps needed for replacing an old cover with a new cover once clip elements according to the invention are in place on the bearing. These steps are where the real advantage of the invention is demonstrated because, as seen in the flow chart of FIG. 19, all that is required is that the ends of the old cover be removed from beneath the resilient arms, the old cover itself be removed from overlying relationship with the support, and the ends of the new cover be inserted beneath the resilient arms, thereby also positioning the new cover over the support. This is accomplished without tools in a very short period of time, yielding increased production efficiency by minimizing machine downtime.

Clip elements according to the invention provide a simple, effective and versatile device for removably attaching protective covers to linear bearings. The fundamental design is readily adapted to any size linear bearing performing any function in any environment. Widespread use of the clip elements will result in increased production efficiency by reducing machine down time during replacement of worn out or damaged covers. Use of clip elements according to the invention will also tend to promote the more frequent replacement of worn covers, thereby maintaining the cleanliness of the moving parts, reducing wear and extending bearing life.

What is claimed is:

1. A clip element adapted for removably attaching a flexible protective cover over an elongated support, said support having a carriage movably mounted for motion along said support, said clip element comprising:
    a resilient arm mountable on an end of either said support or said carriage, said arm extending in spaced relationship to said end and having a predetermined spacing therefrom sized to receive one end of said cover inserted beneath said arm, said arm being resiliently biased toward said end and adapted for removably retaining said cover to said end;
    a mounting plate mounting said arm on said end, said arm being resiliently attached to said mounting plate, said mounting plate being attachable to said end and oriented perpendicularly to the long axis of said elongated support; and
    a flange extending substantially perpendicularly from said mounting plate, said flange being engageable with a surface of said support or said carriage perpendicular to said end and supporting said mounting plate thereon, said flange having a plurality of apertures therethrough, each said aperture being sized to accept a respective fastener for attaching said flange to said surface, and thereby said clip element to said end.

2. A clip element according to claim 1, wherein said apertures are arranged to overlie a plurality of preexisting holes in said end when said mounting plate is mounted thereon, thereby allowing said fasteners to engage said preexisting holes and attach said mounting plate to said end.

3. A clip element according to claim 1, wherein said mounting plate has a plurality of elongated slots therethrough, each of said slots being sized to accommodate a respective fastener attaching said mounting plate to said end.

4. A clip element according to claim 1, further comprising another resilient arm mountable on said end, said other arm extending in spaced relationship to said end and having a predetermined spacing therefrom sized to receive said one end of said cover inserted beneath said other arm, said other arm being resiliently biased toward said end and removably retaining said cover thereto, said arms being arranged side-by-side in spaced relation from one another.

5. A clip element adapted for removably attaching a flexible protective cover over an elongated support, said support having a carriage movably mounted for motion along said support, said clip element comprising:
    a resilient arm mountable on an end of either said support or said carriage, said arm extending in spaced relationship to said end and having a predetermined spacing therefrom sized to receive one end of said cover inserted beneath said arm, said arm being resiliently biased toward said end and adapted for removably retaining said cover to said end;
    a mounting plate mounting said arm on said end, said arm being resiliently attached to said mounting plate, said mounting plate being attachable to said end and oriented perpendicularly to the long axis of said elongated support; and
    a piece of double-sided adhesive tape, said tape being interposable between and adhering to both said mounting plate and said end and thereby attaching said mounting plate to said end.

6. A clip element adapted for removably attaching a flexible protective cover over an elongated support, said support having a carriage movably mounted for motion along said support, said clip element comprising:
    a resilient arm mountable on an end of either said support or said carriage, said arm extending in spaced relationship to said end and having a predetermined spacing therefrom sized to receive one end of said cover inserted beneath said arm, said arm being resiliently biased toward said end and adapted for removably retaining said cover to said end;
    a first mounting plate mounting said arm on said end, said arm being resiliently attached to said first mounting plate, said first mounting plate being attachable to said end and oriented perpendicularly to the long axis of said elongated support;
    a second mounting plate mountable on an opposite end of said carriage in a parallel, spaced-apart relation to said first mounting plate; and
    first and second elongated connecting members extending between and attached to said first and second mounting plates, said connecting members having a length sized to position said first and second mounting plates at opposite ends of said carriage.

7. A clip element according to claim 6, wherein said elongated connecting members are arranged along opposite sides of said carriage.

8. A clip element according to claim 6, wherein said elongated connecting members are fixedly attached to said mounting plates.

9. A clip element according to claim 6, further comprising:
   first and second ears arranged respectively on first and second edges of said mounting plate and extending substantially perpendicularly to the long axis of said support outwardly of said carriage;
   third and fourth ears arranged respectively on first and second edges of said second mounting plate and extending substantially perpendicularly to the long axis of said support outwardly of said carriage;
   said first elongated connecting member extending between said first and said third ears, said second elongated connecting member extending between said second and said fourth ears, said connecting members being respectively attached to said ears and thereby joining said mounting plates together.

10. A clip element according to claim 9, wherein said first and third ears both extend to one side of said carriage.

11. A clip element according to claim 9, wherein one of said elongated connecting members is removably attached to one of said ears.

12. A clip element adapted for removably attaching a flexible protective cover over an elongated support, said support having a carriage movably mounted for motion along said support, said clip element comprising:
   a resilient arm mountable on an end of either said support or said carriage, said arm extending in spaced relationship to said end and having a predetermined spacing therefrom sized to receive one end of said cover inserted beneath said arm, said arm being resiliently biased toward said end and adapted for removably retaining said cover to said end;
   a mounting plate mounting said arm on said end, said arm being resiliently attached to said mounting plate, said mounting plate being attachable to said end and oriented perpendicularly to the long axis of said elongated support; and
   a plurality of tabs extending perpendicularly from said mounting plate parallel to the long axis of said support, at least one of said tabs being positioned to engage a first surface of said support or said carriage, another of said tabs being positioned to engage a second surface of said support or said carriage arranged at an angle to said first surface, said tabs supporting and positioning said mounting plate at a predetermined position at said end when said tabs are engaged respectively with said surfaces.

13. A clip element according to claim 12, further comprising an attachment for mounting said mounting plate to said carriage, said mounting plate having a hole therethrough, said attachment comprising:
   a first threaded fastener adapted to engage an internally threaded aperture located in an end of said carriage, said first threaded fastener having an elongated shaft with a coaxial bore therein, said bore having internal threads; and
   a second threaded fastener having an enlarged head at one end, said second fastener being adapted to engage said bore, said first fastener engaging said aperture in said carriage, said second fastener passing through said hole in said mounting plate and engaging said bore, said mounting plate being captured by said head and thereby attached to said carriage.

14. A clip element adapted for removably attaching a flexible protective cover over an elongated support, said support having a carriage movably mounted for motion along said support, said clip element comprising:
   a resilient arm mountable on an end of either said support or said carriage, said arm extending in spaced relationship to said end and having a predetermined spacing therefrom sized to receive one end of said cover inserted beneath said arm, said arm being resiliently biased toward said end and adapted for removably retaining said cover to said end;
   a first mounting plate mounting said arm on said end, said arm being resiliently attached to said first mounting plate, said first mounting plate being attachable to said end and oriented perpendicularly to the long axis of said elongated support;
   a second mounting plate mountable on an opposite end of said carriage in a parallel, spaced-apart relation to said first mounting plate, said first and second mounting plates each having respective top edges positionable above the top surface of said carriage; and
   a connecting element extending between said top edges and positionable in overlying relationship with said top surface of said carriage, said connecting element being attached to said first and second mounting plates and having a predetermined length positioning said mounting plates at opposite ends of said carriage when said connecting element is in said overlying relationship.

15. A clip element according to claim 14, wherein said connecting element comprises a connecting plate disposed perpendicularly to said mounting plates and adapted to fit in overlying relation with said carriage.

16. A clip element according to claim 15, wherein said connecting plate has a plurality of holes therethrough each sized to accept a respective fastener for attaching said connecting plate to said carriage.

17. A clip element adapted for removably attaching a flexible protective cover over an elongated support, said support having a carriage movably mounted for motion along said support, said clip element comprising:
   a resilient arm mountable on an end of either said support or said carriage, said arm extending in spaced relationship to said end and having a predetermined spacing therefrom sized to receive one end of said cover inserted beneath said arm, said arm being resiliently biased toward said end and adapted for removably retaining said cover to said end;
   a mounting plate mounting said arm on said end, said arm being resiliently attached to said mounting plate, said mounting plate being attachable to said end and oriented perpendicularly to the long axis of said elongated support;
   an attachment for mounting said mounting plate to said carriage, said mounting plate having a hole therethrough, said attachment comprising:
   a first threaded fastener adapted to engage an internally threaded aperture located in an end of said carriage, said first threaded fastener having an elongated shaft with a coaxial bore therein, said bore having internal threads; and
   a second threaded fastener having an enlarged head at one end, said second fastener being adapted to engage said bore, said first fastener engaging said aperture in said carriage, said second fastener passing through said hole in said mounting plate and engaging said bore, said mounting plate being captured by said head and thereby attached to said carriage.

18. A method of removably attaching a flexible protective cover over a portion of an elongated support, said support having a carriage movably mounted thereon, said method comprising the steps of:

mounting a first resilient arm on an end of said support, said first arm extending in spaced relationship to and being resiliently biased toward said support end and having a predetermined spacing therefrom sized to receive one end of said cover when inserted beneath said first arm;

mounting a second resilient arm on an end of said carriage proximal to said support end, said second arm extending in spaced relationship to and being resiliently biased toward said carriage end and having a predetermined spacing therefrom sized to receive another end of said cover when inserted beneath said second arm;

inserting one end of said cover beneath said first arm; and inserting an opposite end of said cover beneath said second arm thereby covering said portion of said support, said portion being located between said proximal carriage end and said support end.

19. A method of replacing an old protective cover overlying a portion of an elongated support with a new protective cover, a carriage being movably mounted on said support for motion therealong, a first resilient arm being mounted on one end of said support in spaced relationship thereto, said first arm being resiliently biased toward said support end and having a predetermined spacing therefrom receiving one end of said old cover inserted beneath said first arm, a second resilient arm being mounted on one end of said carriage in spaced relationship thereto, said second arm being resiliently biased toward said carriage end and having a predetermined spacing therefrom receiving another end of said old cover inserted beneath said second arm, said method comprising the steps of:

removing one end of said old cover from beneath said first arm;

removing an opposite end of said old cover from beneath said second arm;

removing said old cover from overlying relationship with said portion of said support;

inserting one end of said new cover beneath said first arm; and inserting an opposite end of said new cover beneath said second arm, thereby positioning said new cover in overlying relationship with said portion of said support.

\* \* \* \* \*